(12) United States Patent
Horie et al.

(10) Patent No.: US 7,719,852 B2
(45) Date of Patent: May 18, 2010

(54) ELECTRONIC COMPONENT, MOUNTING STRUCTURE OF ELECTRONIC COMPONENT

(75) Inventors: Shigeyuki Horie, Sakai (JP); Yutaka Ota, Echizen (JP); Jun Nishikawa, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 101 days.

(21) Appl. No.: 11/968,716

(22) Filed: Jan. 3, 2008

(65) Prior Publication Data

US 2008/0118721 A1 May 22, 2008

Related U.S. Application Data

(63) Continuation of application No. PCT/JP2006/313589, filed on Jul. 7, 2006.

(30) Foreign Application Priority Data

Jul. 7, 2005 (JP) ............................. 2005-199317
Jul. 5, 2006 (JP) ............................. 2006-185995

(51) Int. Cl.
*H05K 1/18* (2006.01)

(52) U.S. Cl. ..................... 361/763; 361/761; 361/766; 361/310

(58) Field of Classification Search ......... 361/300–310, 361/763, 766
See application file for complete search history.

(56) References Cited

U.S. PATENT DOCUMENTS

| | | | | |
|---|---|---|---|---|
| 6,100,110 | A * | 8/2000 | Kawase et al. | ................. 438/54 |
| 6,124,769 | A | 9/2000 | Igarashi et al. | |
| 6,310,757 | B1 * | 10/2001 | Tuzuki et al. | ............ 361/308.1 |
| 6,773,827 | B2 | 8/2004 | Higuchi | |
| 7,295,421 | B2 * | 11/2007 | Mihara et al. | ............ 361/308.1 |
| 7,304,831 | B2 * | 12/2007 | Yoshii et al. | ............. 361/321.2 |

FOREIGN PATENT DOCUMENTS

| | | |
|---|---|---|
| JP | 4-334007 A | 11/1992 |
| JP | 9-35995 A | 2/1997 |
| JP | 2001-210545 A | 8/2001 |
| JP | 2003-77754 A | 3/2003 |
| KR | 2000-69266 A | 11/2000 |
| KR | 2001-107723 A | 12/2001 |

\* cited by examiner

OTHER PUBLICATIONS

Official communication issued in the International Application No. PCT/JP2006/313589, mailed on Aug. 22, 2006.

*Primary Examiner*—Tuan T Dinh
(74) *Attorney, Agent, or Firm*—Keating & Bennett, LLP

(57) ABSTRACT

A high-reliability electronic component without reduction in insulation resistance under high-temperature and high-humidity conditions has satisfactory solderability of external electrodes. The electronic component includes a main body and external electrodes disposed on surfaces of the main body, the external electrodes include underlying electrode layers each containing a metal, alloy layers each disposed on the corresponding underlying electrode layer, Ni plating layers each disposed on the corresponding alloy layer, Ni oxide layers each disposed on the corresponding Ni plating layers, and upper plating layers each disposed on the corresponding Ni oxide layer, each Ni oxide layer having a thickness of about 150 nm or less, and each Ni plating layer having an average particle size of Ni particles of about 2 µm or more. To form the Ni plating layers having reduced grain boundaries, heat treatment is performed at about 500° C. to about 900° C. inclusive in a reducing atmosphere having an oxygen concentration of about 100 ppm or less.

7 Claims, 8 Drawing Sheets

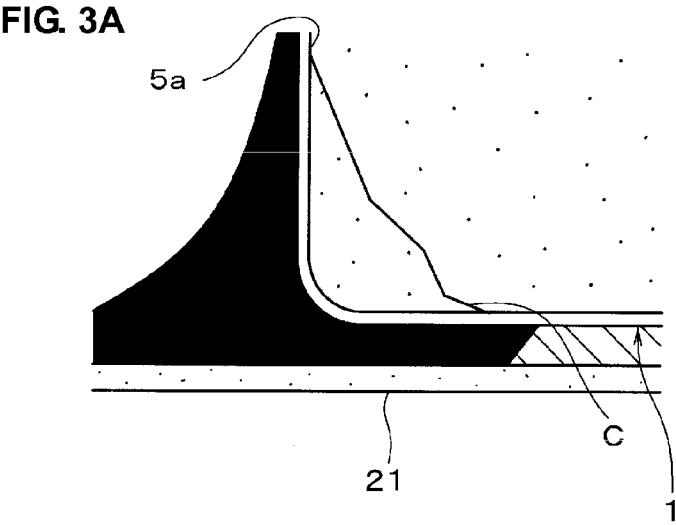
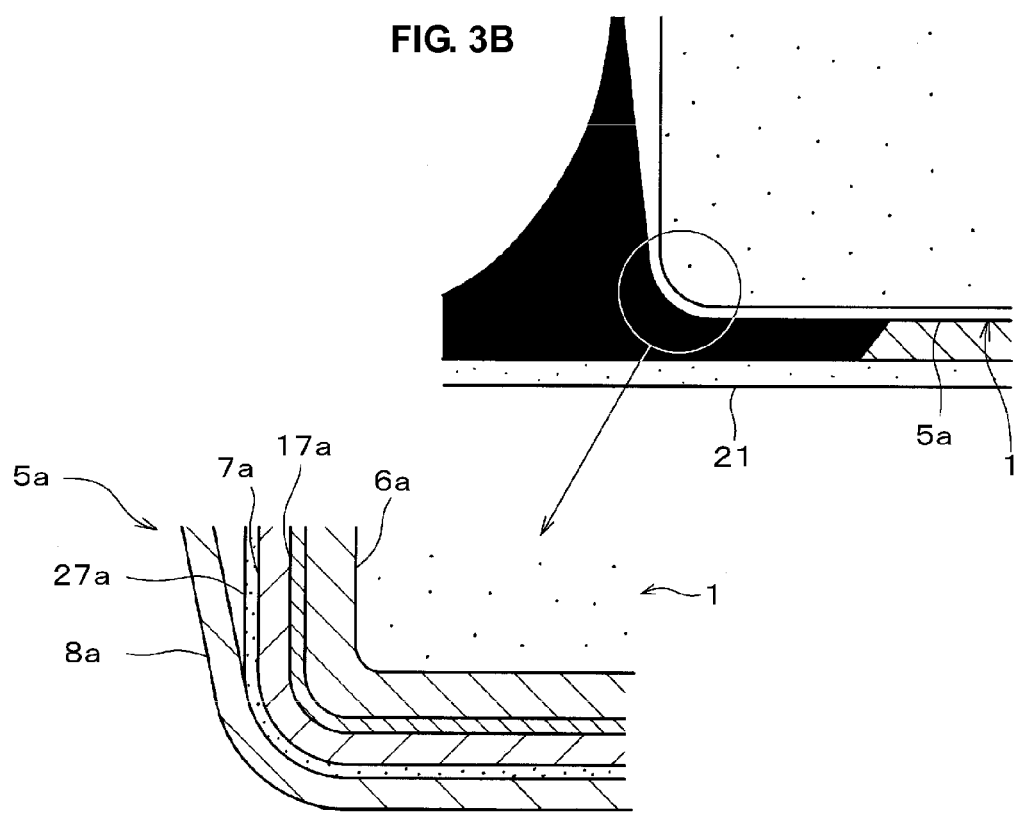

ELECTRONIC COMPONENT, MOUNTING STRUCTURE OF ELECTRONIC COMPONENT

BACKGROUND OF THE INVENTION

1. Field of the Invention

The present invention relates to an electronic component, a mounting structure of the electronic component, and a process for producing the electronic component. Specifically, the present invention relates to an electronic component having a structure in which external electrodes are disposed on surfaces of the electronic component, a mounting structure of the electronic component, and a process for producing the electronic component.

2. Description of the Related Art

An example of ceramic electronic components each having a structure in which external electrodes are disposed on surfaces of a ceramic element is an electronic chip component, such as a multilayer ceramic capacitor, having a structure including a plurality of internal electrode layers 52a and 52b alternately disposed; ceramic layers 53, each internal electrode layer 52a being disposed opposite the corresponding internal electrode layer 52b with a corresponding one of the ceramic layers 53 provided therebetween; a ceramic laminate 51 having end surfaces 54a and 54b, the internal electrode layers 52a being connected to the end surface 54a, and the internal electrode layers 52b being connected to the end surface 54b; and a pair of external electrodes 55a and 55b, the external electrodes 55a and 55b being disposed on the end surfaces 54a and 54b, respectively, and being connected to the internal electrode layers 52a and 52b, respectively, as shown in FIG. 9. See, for example, JP 2001-210545.

In this multilayer ceramic capacitor, JP 2001-210545 discloses that the external electrode 55a includes a sintered electrode layer 56a, a Ni plating layer 57a disposed on the sintered electrode layer 56a, and a Sn plating layer 58a; and the external electrode 55b includes a sintered electrode layer 56b, a Ni plating layer 57b disposed on the sintered electrode layer 56b, and a Sn plating layer 58b. In general, the Ni plating layers 57a and 57b are arranged to prevent solder leaching of the sintered electrode layers 56a and 56b. The Sn plating layers 58a and 58bare arranged to improve solder wettability.

In view of the prevention of environmental pollution, lead-free solder has recently been used for mounting of electronic components. An example of the lead-free solder is Sn—Ag—Cu-based lead-free solder containing Zn.

In the case where a multilayer ceramic capacitor including external electrodes each having the above-described structure is mounted with the lead-free solder containing Zn, the diffusion of Zn into Ni plating layers constituting the external electrodes causes the formation of voids functioning as paths for the penetration of water and the like into the Ni plating layers. Furthermore, the elimination of Zn contained in the lead-free solder, i.e., the diffusion of Zn into the Ni plating layers, causes the formation of voids in soldered portions (lead-free solder) after soldering, the voids functioning as paths for the penetration of water.

As a result, the moisture resistance of the multilayer ceramic capacitor mounted on a mounting object, such as a circuit board, is reduced to disadvantageously degrade reliability.

SUMMARY OF THE INVENTION

In order to overcome the problems described above, preferred embodiments of the present invention provide a high-reliability electronic component without reduction in insulation resistance under high-temperature and high-humidity conditions, the component having satisfactory solderability of external electrodes. In addition, preferred embodiments of the present invention provide a mounting structure of the electronic component and a process for producing the electronic component.

To overcome the problems, an electronic component according to a first preferred embodiment of the present invention includes a main body and an external electrode disposed on a surface of the main body, wherein the external electrode includes an underlying electrode layer containing a metal, an alloy layer composed of Ni and the metal contained in the underlying electrode layer, the alloy layer being disposed on the underlying electrode layer, a Ni plating layer disposed on the alloy layer, a Ni oxide layer disposed on the Ni plating layer, and an upper plating layer disposed on the Ni oxide layer, the Ni oxide layer having a thickness of about 150 nm or less, and the Ni plating layer having an average particle size of Ni particles of about 2 μm or more.

According to a second preferred embodiment of the present invention, the electronic component described in the first preferred embodiment of the present invention is characterized in that the underlying electrode layer is mainly composed of Cu.

According to a third preferred embodiment of the present invention, the electronic component described in the first or second preferred embodiment of the present invention is characterized in that the upper plating layer disposed on the Ni oxide layer is composed of Sn as a main component.

According to a fourth preferred embodiment of the present invention, the electronic component described in any one of the first to third preferred embodiments of the present invention is characterized in that the main body of the electronic component includes a sintered ceramic body and an internal electrode disposed in the sintered ceramic body, wherein the internal electrode is electrically connected to the corresponding external electrode.

According to a fifth preferred embodiment of the present invention, a mounting structure of the electronic component described in any one of the first to fourth preferred embodiments of the present invention is characterized in that the external electrode of the electronic component is electrically connected to the land of the mounting board with lead-free solder.

According to a sixth preferred embodiment of the present invention, the mounting structure of the electronic component described in the fifth preferred embodiment of the present invention is characterized in that the lead-free solder contains Zn.

According to a seventh preferred embodiment of the present invention, the mounting structure of the electronic component described in the fifth or sixth preferred embodiment of the present invention is characterized in that the upper plating layer is partially detached from the Ni oxide layer at the interface therebetween.

According to an eighth preferred embodiment of the present invention, a process for producing an electronic component includes the steps of: applying a conductive paste containing a metal powder as a conductive component to a main body of the electronic component and then baking the paste at a predetermined temperature to form an underlying electrode layer; forming a Ni plating layer on the underlying electrode layer; performing heat treatment at about 500° C. to about 900° C. inclusive in a reducing atmosphere having an oxygen concentration of about 100 ppm or less after the formation of the Ni plating layer; and forming an upper plating layer on the Ni plating layer.

As described in the first preferred embodiment of the present invention, the external electrode includes the underlying electrode layer; the alloy layer disposed on the underlying electrode layer; the Ni plating layer disposed on the alloy layer; the Ni oxide layer disposed on the surface of the Ni plating layer, the Ni oxide layer having a small thickness; and the upper plating layer disposed on the Ni oxide layer. Thus, for example, when the electronic component is mounted with lead-free solder, it is possible to inhibit the diffusion of the constituent material, such as Zn, of the lead-free solder into the Ni plating layer and to prevent a decrease in insulation resistance even under high-temperature and high-humidity conditions.

A composite layer group including the Ni plating layer having an average particle size of Ni particles of about 2 μm or more and the Ni oxide layer having a thickness of about 150 nm or less disposed on the Ni plating layer according to a preferred embodiment of the present invention has reduced gaps between grains, due to grain growth in the Ni plating layer. For example, the composite layer group can inhibit the penetration (diffusion) of Zn ions formed in the presence of water. Furthermore, the composite layer does not have a gap functioning as a path for water and can thus prevent the passage of water.

For example, the composite layer group including the Ni plating layer and the Ni oxide layer having a thickness of about 150 nm or less disposed thereon can be formed by heat-treating the Ni plating layer at about 500° C. to about 900° C. inclusive in a non-oxidative atmosphere. That is, for example, the heat treatment at about 500° C. to about 900° C. inclusive in a non-oxidative atmosphere suppresses the oxidation of the Ni plating layer to form the Ni oxide layer having a thickness of about 150 nm or less. Thus, the heat treatment allows grain boundaries in the Ni plating layer to decrease while ensuring satisfactory solderability, thereby forming the Ni plating layer having few portions functioning as paths for water.

In general, the particle size of each of Ni particles (grains) constituting the Ni plating layer preferably is as small as about 1 μm or less, for example. The heat treatment allows the average particle size of the Ni particles to increase to about 2 μm or more, thereby reducing the gaps between the grains.

Accordingly, preferred embodiments of the present invention provide a high-reliability electronic component having satisfactory solderability without a reduction in insulation resistance even under high-temperature and high-humidity conditions when the electronic component is mounted with lead-free solder.

In the electronic component according to the second preferred embodiment, the underlying electrode layer is mainly composed of Cu. In this case, it is possible to provide the high-reliability external electrode including the underlying electrode layer having high conductivity and satisfactory affinity for the Ni plating layer. This allows this preferred embodiment of the present invention to be more effective.

In the electronic component according to the third preferred embodiment, the upper plating layer disposed on the corresponding Ni oxide layer is mainly composed of Sn. Thus, in cases of using lead-free solder as well as normal Pb—Sn-based solder, it is possible to provide the external electrode having satisfactory solderability. This allows this preferred embodiment of the present invention to be more effective.

In the electronic component according to the fourth preferred embodiment, the external electrode is disposed on the sintered ceramic body (the main body of the electronic component) including the internal electrode, the external electrode being connected to the internal electrode. This structure prevents the failure of the internal electrode caused by penetration of a plating solution into the main body of the electronic component and prevents degradation in properties due to the penetration of moisture in the external environment into the main body of the electronic component. Thus, it is possible to provide a high-reliability electronic component, such as a multilayer ceramic capacitor.

In the mounting structure of the electronic component according to the fifth preferred embodiment, the external electrode of the electronic component is electrically connected to the land of the mounting board with lead-free solder. Even when the external electrode of the electronic component is electrically connected to the land of the mounting board with the lead-free solder, the diffusion of the constituent, such as Zn, of the lead-free solder into the Ni plating layers is inhibited since the Ni plating layer of the electronic component according to a preferred embodiment of the present invention has reduced grain boundaries. Therefore, high-reliability mounting can be performed.

In the mounting structure of the electronic component according to the sixth preferred embodiment, the lead-free solder containing Zn is preferably used. In a known external electrode including an underlying electrode layer, a Ni plating layer disposed on the underlying electrode layer, and an upper plating layer disposed on the Ni plating layer, the diffusion of Zn into the Ni plating layer causes the formation of gaps functioning as paths for penetration of water into the Ni plating layer. Furthermore, the disappearance of Zn contained in the lead-free solder, i.e., the diffusion of Zn into the Ni plating layers, causes the formation of voids in solder portions after soldering, the voids functioning as paths for the penetration of water. As a result, moisture resistance is reduced to degrade reliability. In the electronic component according to a preferred embodiment of the present invention, the external electrode includes the Ni plating layer having reduced grain boundaries. Thus, even when the external electrode is connected to the land of the mounting board with the lead-free solder containing Zn, the diffusion of Zn into Ni plating layer is inhibited, thereby improving moisture resistance and reliability.

In the mounting structure of the electronic component according to the seventh preferred embodiment, the Ni oxide layer is partially detached from the upper plating layer at the interface therebetween. Even in the state in which the detachment occurs, continuity can be maintained so as not to degrade circuit functions unless the main body of the electronic component cracks to establish a short circuit.

That is, since the electronic component according to a preferred embodiment of the present invention includes the Ni plating layer having reduced grain boundaries, the diffusion of the constituent, such as Zn, of the lead-free solder can be inhibited to improve moisture resistance even when the external electrode is connected to the land of the mounting board with, for example, lead-free solder containing Zn. Furthermore, when the Ni oxide layer is partially detached from the upper plating layer at the interface therebetween, the main body of the electronic component can be prevented from cracking. Even in the state in which the detachment occurs, continuity can be advantageously maintained so as not to degrade circuit functions.

The process for producing an electronic component according to the eighth preferred embodiment of the present invention includes forming the Ni plating layer by depositing Ni on the underlying electrode layer, heat-treating the Ni plating layer at about 500° C. to about 900° C. inclusive in a reducing atmosphere having an oxygen concentration of about 100 ppm or less, and then forming upper plating layer on the Ni plating layers. Thus, it is possible to surely produce a high-reliability electronic component including a main body of the electronic component and the external electrode that has the underlying electrode layer disposed on a surface of the main body of the electronic component, alloy layer composed of Ni and a metal contained in the underlying electrode layer and formed in the step of forming the Ni plating layer on the underlying electrode layer, the Ni plating layer disposed on the alloy layer, the Ni oxide layer disposed on the Ni plating layer and formed in the heat-treatment step, and the upper plating layer disposed on the Ni oxide layer.

That is, after the formation of the Ni plating layer by Ni-plating, for example, the heat-treatment at a high temperature in the range of about 500° C. to about 900° C. inclusive in the reducing atmosphere having an oxygen concentration of about 100 ppm or less enables Ni grains to grow while significant oxidation of the Ni plating layers is prevented and can strengthen the bonding between particles constituting the Ni plating layers, thereby inhibiting the diffusion of the constituent, such as Zn, of lead-free solder into the Ni plating layers. Furthermore, in the electronic component which includes the external electrode having the Ni plating layer having reduced grain boundaries and which is produced by the process according to a preferred embodiment of the present invention, the Ni plating layer has very few portions functioning as paths for penetration of water. Moreover, Zn contained in solder is not disappeared. Thus, the formation of a void in solder can be prevented even when, for example, lead-free solder containing Zn is used as solder for use in mounting.

Therefore, a high-reliability electronic component having satisfactory solderability without a reduction in insulation resistance even under high-temperature and high-humidity conditions can be produced by the process according to preferred embodiments of the present invention for producing an electronic component.

In preferred embodiments of the present invention, electrolytic plating is preferably used as plating for forming the Ni plating layers. Alternatively, electroless plating may be used.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3A is a schematic fragmentary cross-sectional view of a multilayer ceramic capacitor according to COMPARATIVE EXAMPLE, the multilayer ceramic capacitor having a crack generated in bending a mounting board.

FIG. 3B is a fragmentary cross-sectional view of a multilayer ceramic capacitor according to a preferred embodiment (EXAMPLE 1) of the present invention, the multilayer ceramic capacitor having no crack even in bending a mounting board.

DETAILED DESCRIPTION OF THE PREFERRED EMBODIMENTS

Advantages of the present invention will be described in detail below on the basis of examples of preferred embodiments of the present invention.

EXAMPLE 1

Figure 1:
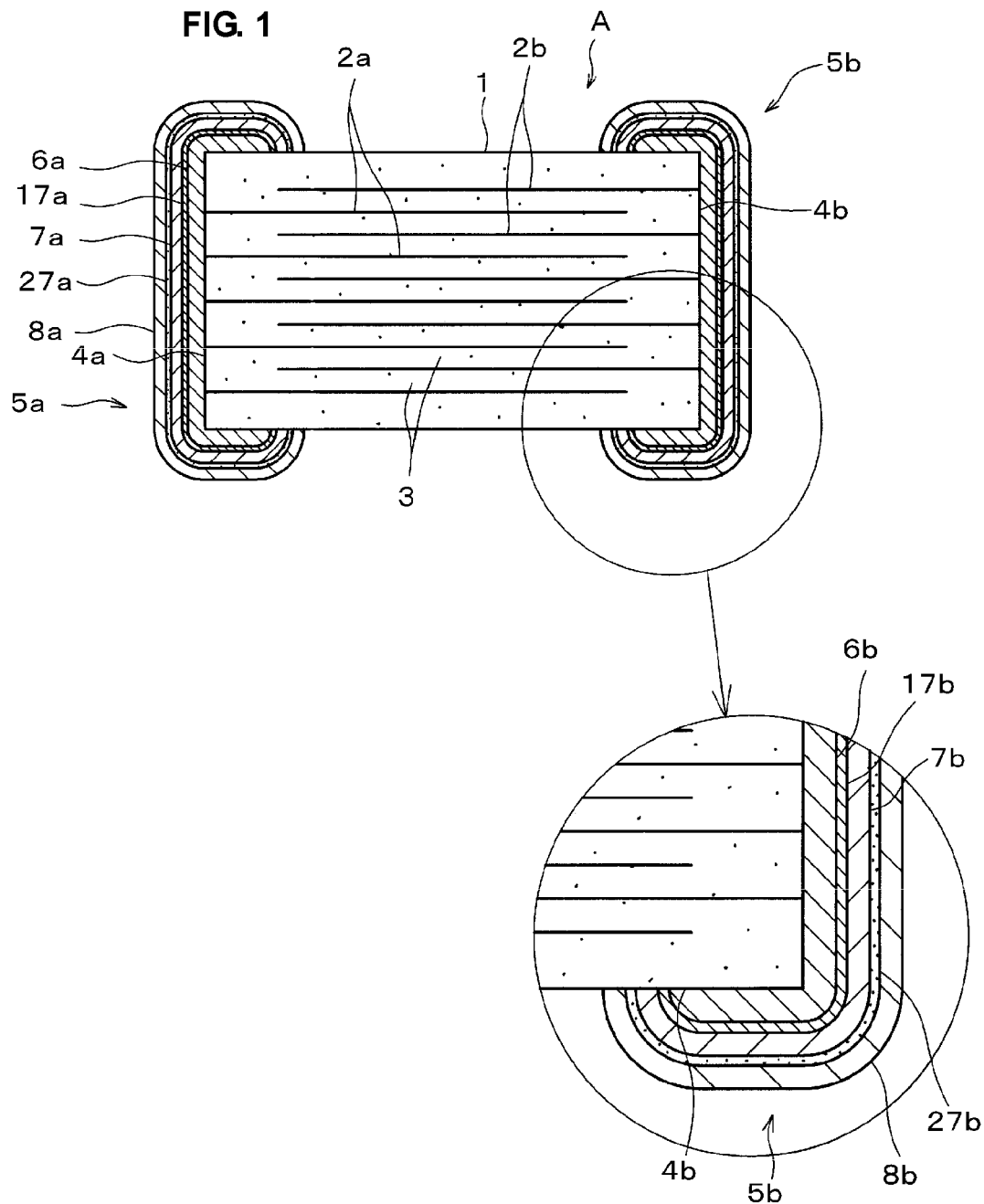
FIG. 1 is a cross-sectional view of an electronic component (multilayer ceramic capacitor) according to a preferred embodiment (EXAMPLE 1) of the present invention.

FIG. 1 is a cross-sectional view of an electronic component (multilayer ceramic capacitor in this EXAMPLE) A produced by a process for producing an electronic component according to an example (EXAMPLE 1) of a preferred embodiment of the present invention.

As shown in FIG. 1, the multilayer ceramic capacitor A includes a plurality of internal electrodes (Ni electrodes) 2a and 2b alternately disposed; ceramic layers 3, each internal electrode 2a being opposite the corresponding internal electrode 2b with a corresponding one of the ceramic layers 3 provided therebetween; a ceramic body (main body of the electronic component) 1 having end surfaces 4a and 4b, the internal electrodes 2a being connected to the end surface 4a, and the internal electrodes 2b being connected to the end surface 4b; and a pair of external electrodes 5a and 5b, the external electrodes 5a and 5b being disposed on the end surfaces 4a and 4b, respectively, and being connected to the internal electrodes 2a and 2b, respectively.

In the multilayer ceramic capacitor A according to this example, the external electrodes 5a and 5b each having a 5-layer structure including:

(a) underlying electrode layers 6a and 6b, which are baked Cu electrodes;

(b) alloy layers 17a and 17b each composed of Ni and a metal (Cu) contained in the underlying electrode layers 6a and 6b and disposed on the underlying electrode layers 6a and 6b;

(c) Ni plating layers 7a and 7b disposed on the alloy layers 17a and 17b;

(d) Ni oxide layers 27a and 27b disposed on the Ni plating layers 7a and 7b;

(e) Sn plating layers 8a and 8b for improving solder wettability, the Sn plating layers 8a and 8b being disposed on the Ni oxide layers 27a and 27b.

A process for producing the multilayer ceramic capacitor A will be described below.

(1) After glass frit was mixed with a Cu powder serving as a conductive component, an appropriate amount of an organic vehicle was added thereto. The resulting mixture was mixed and dispersed with a three-roll mill to form a conductive paste.

(2) Both end surfaces of a fired ceramic body (main body of the electronic component) 1 were dipped in the conductive paste to apply the conductive paste to the end surfaces 4a and 4b of the ceramic body 1 and dried. Then, the conductive paste was baked at about 800° C. for about 10 minutes in a reducing atmosphere to form the underlying electrode layers (baked Cu electrode) 6a and 6b.

(3) Subsequently, the underlying electrode layers 6a and 6b were electrolytically Ni-plated to form the Ni plating layers 7a and 7b each having a thickness of about 3 μm, for example.

In this step, the alloy layers 17a and 17b were formed between the underlying electrode layers 6a and 6b and the Ni plating layers 7a and 7b.

(4) Then, Ni plating layers 7a and 7b were subjected to heat treatment under predetermined conditions.

The heat treatment were performed various conditions described below. The resulting multilayer ceramic capacitors were checked for the state of the failure of insulation resistance and solderability of the external electrodes.

Heat-Treatment Conditions (a) Heat-treatment temperature:
100° C., 300° C., 500° C., 700° C., 900° C., and 1000° C.

(b) Oxygen concentration in heat treatment:
50 ppm, 100 ppm, 150 ppm, and 200 ppm (c) Heat-treatment time:
1 hour (d) Ni oxide layers 27a and 27b were formed on the Ni plating layers 7a and 7b in the heat-treatment step. The Ni oxide layers 27a and 27b were changed in response to the heat-treatment conditions.

(5) After the completion of the heat treatment, the Ni plating layers 7a and 7b having the Ni oxide layers 27a and 27b on the surface thereof were electrolytically Sn-plated to form the Sn plating layers 8a and 8b for improving solderability.

In this way, the multilayer ceramic capacitors A (samples) were obtained having the structure shown in FIG. 1.

For purposes of comparison, multilayer ceramic capacitors were produced under the same conditions as those in EXAMPLE 1 except heat treatment.

In the samples of the multilayer ceramic capacitors, the average particle size of Ni particles constituting the Ni plating layers and the thicknesses of the Ni oxide layers were checked. Table 1 shows the average particle size of the Ni particles. Table 2 shows the thicknesses of the Ni oxide layers.

The average particle size of the Ni particles constituting the Ni plating layers were determined by the following method:

(1) The section taken along the longitudinal direction and the thickness direction of each multilayer ceramic capacitor was polished by focused ion beam (FIB). The Ni particles on a scanning ion microscopy (SIM) photograph under an approximately 30 μm viewing field were observed.

(2) A linear line having a length of about 10 μm was drawn at a Ni plating layer portion on the SIM photograph. The number of Ni particles overlapping the linear line was counted.

(3) A value obtained by dividing about 10 μm by the number of the Ni particles overlapping the linear line was defined as the average particle size of the Ni particles.

The thickness of each Ni oxide layer was determined by polishing the section taken along the longitudinal direction and thickness direction of each multilayer ceramic capacitor using focused ion beam (FIB) and then measuring the dispersion thickness of Ni oxide using a wavelength dispersive x-ray spectrometer (WDX) under an approximately 10 μm viewing field.

TABLE 1

| | | Average particle size of Ni particles constituting Ni plating layer (μm) | | | |
|---|---|---|---|---|---|
| Sample | Heat-treatment temperature (° C.) | Oxygen concentration 50 ppm | Oxygen concentration 100 ppm | Oxygen concentration 150 ppm | Oxygen concentration 200 ppm |
| 1 | Heat treatment was not performed | | | 0.5 | |
| 2 | 100 | 0.7 | 0.8 | 0.8 | 0.8 |
| 3 | 300 | 0.9 | 1.0 | 1.1 | 1.3 |
| 4 | 500 | 2.0 | 2.2 | 2.3 | 2.3 |
| 5 | 700 | 2.5 | 2.5 | 2.7 | 2.7 |
| 6 | 900 | 2.8 | 2.9 | 3.0 | 3.1 |
| 7 | 1000 | 3.3 | 3.5 | 3.5 | 3.6 |

TABLE 2

| | | Thickness of Ni oxide layer (nm) | | | |
|---|---|---|---|---|---|
| Sample | Heat-treatment temperature (° C.) | Oxygen concentration 50 ppm | Oxygen concentration 100 ppm | Oxygen concentration 150 ppm | Oxygen concentration 200 ppm |
| 1 | Heat treatment was not performed | | | 50 | |

TABLE 2-continued

| | | Thickness of Ni oxide layer (nm) | | | |
|---|---|---|---|---|---|
| Sample | Heat-treatment temperature (° C.) | Oxygen concentration 50 ppm | Oxygen concentration 100 ppm | Oxygen concentration 150 ppm | Oxygen concentration 200 ppm |
| 2 | 100 | 100 | 120 | 160 | 185 |
| 3 | 300 | 115 | 130 | 160 | 190 |
| 4 | 500 | 120 | 135 | 165 | 200 |
| 5 | 700 | 130 | 140 | 170 | 210 |
| 6 | 900 | 145 | 150 | 200 | 220 |
| 7 | 1000 | 155 | 160 | 210 | 230 |

As shown in Table 1, the results from the heat treatment performed at about 500° C. or higher in atmospheres having oxygen concentrations of about 50 ppm to about 200 ppm inclusive demonstrated that the average particle size of the Ni particles constituting the Ni plating layers was about 2 μm or more.

As shown in Table 2, the results from the heat treatment performed at about 900° C. or lower in a reducing atmosphere having an oxygen concentration of about 100 ppm or less demonstrated that the thickness of each of the Ni plating layers was about 150 nm or less.

It is apparent from the results that external electrodes each including the Ni plating layer having an average particle size of Ni particles of about 2 μm or more and the Ni oxide layer having a thickness of about 150 nm or less can be formed by performing the heat treatment at about 500° C. to about 900° C. inclusive in a reducing atmosphere having an oxygen concentration of about 100 ppm or less.

The multilayer ceramic capacitors produced in EXAMPLE 1 were as follows:

Dimensions, length: 2.0 mm, width: 1.25 mm, height: 1.25 mm

Dielectric ceramic material: BiTiO$_3$-based dielectric ceramic material

Number of the internal electrodes stacked: 400

Material of internal electrode: Ni

Figure 2:
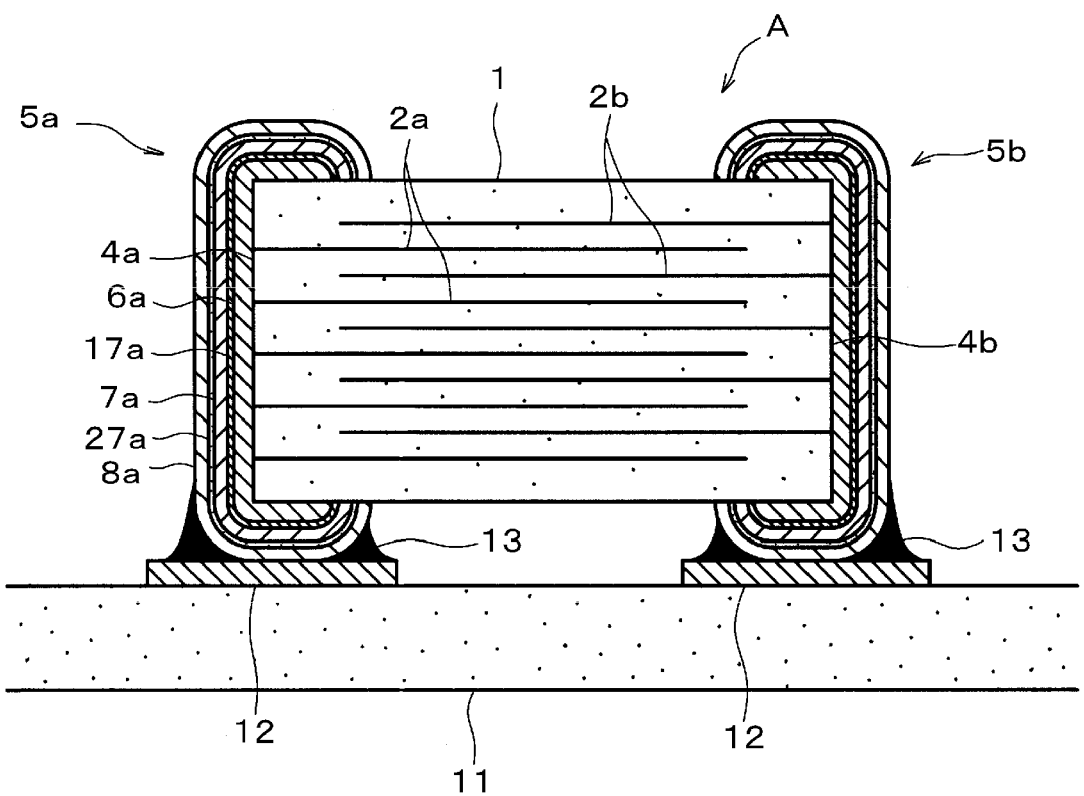
FIG. 2 shows a mounting structure of an electronic component (multilayer ceramic capacitor) according to a preferred embodiment (EXAMPLE 1) of the present invention.

As schematically shown in FIG. 2, mounting was performed as follows: the multilayer ceramic capacitor A was subjected to reflow soldering with lead-free solder containing Zn at approximately 230° C. in N$_2$ to electrically and mechanically bond the external electrodes 5a and 5b to electrodes 12 disposed on the board 11 with solder (lead-free solder) 13.

In EXAMPLE 1, lead-free solder containing about 3 percent by weight Bi, about 8 percent by weight Zn, and Sn constituting the remainder (Sn—8Zn—3Bi) was used.

Then, the solder (lead-free solder) 13 was re-melted to dismount the multilayer ceramic capacitor A. The multilayer ceramic capacitor A was left standing for approximately 72 hours at about 125° C., about 1.2 atm, and about 95% RH while a rated voltage was applied, for example. A change in the insulation resistance of the multilayer ceramic capacitor was checked. The multilayer ceramic capacitor in which the insulation resistance was reduced compared with an initial value was defined as a failure, and the number of failures was counted.

Table 3 shows the results.

With respect to the multilayer ceramic capacitors produced above, solderability test was performed at about 230° C. with lead-free solder containing about 3 percent by weight Bi, about 8 percent by weight Zn, and Sn constituting the remainder (Sn—8Zn—3Bi).

The solderability test was performed by immersing the multilayer ceramic capacitors in a solder bath for about three seconds. The multilayer ceramic capacitor in which the area of solder attached was about 95% or less was determined as a failure.

Table 4 shows the results.

Numbers 1-1 to 1-7 shown in Table 3 were subjected to the insulation resistance test, the Nos. 1-1 to 1-7 corresponding to samples 1 to 7 shown in Tables 1 and 2. Numbers 2-1 to 2-7 shown in Table 4 were subjected to the solderability test, Nos. 2-1 to 2-7 corresponding to samples 1 to 7 shown in Tables 1 and 2.

TABLE 3

| | | Number of occurrence of failure of insulation resistance N = 5 | | | |
|---|---|---|---|---|---|
| No. | Heat-treatment temperature (° C.) | Oxygen concentration 50 ppm | Oxygen concentration 100 ppm | Oxygen concentration 150 ppm | Oxygen concentration 200 ppm |
| 1-1 | Heat treatment was not performed | | | 5 | |
| 1-2 | 100 | 5 | 5 | 5 | 5 |
| 1-3 | 300 | 5 | 5 | 5 | 5 |
| 1-4 | 500 | 0 | 0 | 0 | 0 |
| 1-5 | 700 | 0 | 0 | 0 | 0 |
| 1-6 | 900 | 0 | 0 | 0 | 0 |
| 1-7 | 1000 | 0 | 0 | 0 | 0 |

TABLE 4

| No. | Heat-treatment temperature (° C.) | Number of occurrence of failure of solderability N = 10 | | | |
| --- | --- | --- | --- | --- | --- |
| | | Oxygen concentration 50 ppm | Oxygen concentration 100 ppm | Oxygen concentration 150 ppm | Oxygen concentration 200 ppm |
| 2-1 | Heat treatment was not performed | | | 0 | |
| 2-2 | 100 | 0 | 0 | 4 | 8 |
| 2-3 | 300 | 0 | 0 | 3 | 9 |
| 2-4 | 500 | 0 | 0 | 5 | 10 |
| 2-5 | 700 | 0 | 0 | 8 | 10 |
| 2-6 | 900 | 0 | 0 | 10 | 10 |
| 2-7 | 1000 | 1 | 4 | 10 | 10 |

As is apparent from Nos. 1-4 to 1-7 in Table 3, performing the heat treatment at about 500° C. or higher after Ni plating of the capacitors can inhibit a reduction in the insulation resistance of the multilayer ceramic capacitors. The reason for this may be that the penetration (diffusion) of Zn ions generated by water is prevented, and the corrosion of the Ni plating layers is inhibited since the heat treatment allows grains of the Ni plating layers to be grown to eliminate gaps between the grains.

As a result, it is possible to inhibit the penetration of water from the exterior into a ceramic laminate through the external electrodes, thus preventing the reduction in insulation resistance.

In both cases where the heat treatment was performed at a temperature of less than about 500° C. as in Nos. 1-2 and 1-3 and where the heat treatment was not performed as in No. 1-1, reductions in insulation resistance were observed. This may be because in the case where the heat treatment was performed at a temperature of less than about 500° C., grains in the Ni plating layers were not sufficiently grown; and in the case where the heat treatment was not performed, grains in the Ni plating layers remained unchanged from the formation of the Ni plating layers and were not grown.

With respect to solderability, as shown in Nos. 2-2 to 2-6 in Table 4, no failure of solderability occurred at a heat-treatment temperature of about 100° C. to about 900° C. inclusive and at an oxygen concentration in the atmosphere of about 50 ppm and about 100 ppm. However, the failure of solderability occurred at an oxygen concentration of about 150 ppm or more. This may be because at an oxygen concentration of about 150 ppm or more, the oxidation of surfaces of the Ni plating layers proceeded to inhibit alloying of solder and Ni.

As shown in No. 2-7 in Table 4, the failure of solderability occurred at a heat-treatment temperature of about 1000° C., regardless of oxygen concentration in the atmosphere.

In the case of No. 2-1, in which the heat treatment was not performed, as comparative example, the Ni plating layers were not oxidized, and no failure of solderability occurred.

As is apparent from the results described above, performing the heat treatment at a temperature in the range of about 500° C. to about 900° C. inclusive in a reducing atmosphere having an oxygen concentration of about 100 ppm or less after the formation of the Ni plating layers prevents the oxidation of the Ni plating layers and prevents a degradation in solderability. Furthermore, the grains in the Ni plating layers can be grown, thereby inhibiting the diffusion of Zn.

Therefore, it is possible to prevent a reduction in insulation resistance even under high-temperature and high-humidity conditions by applying the present invention. Moreover, it is possible to surely produce an electronic component having satisfactory solderability.

EXAMPLE 2

In EXAMPLE 2, multilayer ceramic capacitors having the similar structure shown in FIG. 1 as in EXAMPLE 1 were produced in the same production process and the same production conditions as in EXAMPLE 1.

However, in EXAMPLE 2, conditions for heat-treating the Ni plating layers 7a and 7b disposed on the underlying electrode layers 6a and 6b were as follows. Any other condition was the same as in EXAMPLE 1.

(a) Heat-treatment temperature:
300° C., 500° C., 700° C., 900° C., and 1100° C.
(b) Oxygen concentration in heat treatment:
50 ppm, 100 ppm, and 150 ppm
(c) Heat-treatment time:
1 hour The resulting multilayer ceramic capacitors were subjected to reflow soldering with lead-free solder containing Zn at about 230° C. in a $N_2$ atmosphere to be mounted on a board. The multilayer ceramic capacitors were left standing for approximately 144 hours at about 125° C., about 1.2 atm, and about 95% RH while a rated voltage was applied, for example. A change in the insulation resistance of each multilayer ceramic capacitor was checked. The multilayer ceramic capacitor in which the insulation resistance was reduced compared with an initial value was defined as a failure, and the number of failures was counted.

Table 5 shows the results.

TABLE 5

| Temperature (° C.) | Number of occurrence of failure of insulation resistance N = 5 | | |
| --- | --- | --- | --- |
| | Oxygen concentration 50 ppm | Oxygen concentration 100 ppm | Oxygen concentration 150 ppm |
| 300 | 5 | 5 | 5 |
| 500 | 0 | 0 | 0 |
| 700 | 0 | 0 | 0 |
| 900 | 0 | 0 | 0 |
| 1100 | 5 | 5 | 5 |

As is apparent from Table 5, performing heat treatment at a temperature of about 500° C. to about 900° C. inclusive and an oxygen concentration of about 50 ppm to about 150 ppm inclusive can inhibit a reduction in the insulation resistance of the multilayer ceramic capacitors. This maybe because the heat treatment disperses Cu, which is a main component of the underlying electrode layers, into the Ni plating layers to form a high-density alloy layers, thus improving denseness.

Compositions were analyzed by an energy dispersive x-ray analyzer (EDX). The results demonstrated that a Ni—Cu alloy layer (Cu: 30 atomic percent or more) having a thickness of about 0.5 μm or more was formed between each underlying electrode layer and the corresponding Ni plating layer under conditions in which the insulation resistance was not reduced.

At a heat-treatment temperature of about 1100° C., the alloy layer was formed. However, a degradation in insulation resistance occurred. This may be because the flow of the glass component in the underlying electrode layers caused structural breaking.

In addition, the resulting multilayer ceramic capacitors were subjected to solderability test at about 230° C. with lead-free solder containing about 3 percent by weight Bi, about 8 percent by weight Zn, and Sn constituting the remainder (Sn—8Zn—3Bi).

The solderability test was performed by immersing the multilayer ceramic capacitors in a solder bath for three seconds. The multilayer ceramic capacitor in which the area of solder attached was about 95% or less was determined as a failure.

Table 6 shows the results.

TABLE 6

| Temperature (° C.) | Number of occurrence of failure of solderability N = 10 | | |
|---|---|---|---|
| | Oxygen concentration 50 ppm | Oxygen concentration 100 ppm | Oxygen concentration 150 ppm |
| 300 | 0 | 0 | 3 |
| 500 | 0 | 0 | 5 |
| 700 | 0 | 0 | 8 |
| 900 | 0 | 0 | 10 |
| 1100 | 1 | 4 | 10 |

As is apparent from Table 6, satisfactory solderability is obtained at an oxygen concentration of about 100 ppm or less and at heat-treatment temperature of about 900° C. or lower. This may be because the inhibition of the oxidation of surfaces of the Ni plating layers in the range satisfying the requirements reduces the impact on solderability.

Solderability significantly deteriorates with increasing heat-treatment temperature at an oxygen concentration of about 150 ppm or more. This may be because the oxidation of the surfaces of the Ni plating layers proceeds to inhibit alloying of Ni and the component in the solder.

As described above, heat treatment is performed under the conditions described in EXAMPLE 2 after the underlying electrode layers are Ni-plated. Thus, the high-density alloy layer for inhibiting the degradation of the insulation resistance can be formed between each underlying electrode layer and the corresponding Ni plating layer. It is possible to an electronic component including external electrodes having satisfactory solderability without a reduction in insulation resistance even when soldering is performed with lead-free solder.

EXAMPLE 3

In EXAMPLE 3, multilayer ceramic capacitors having the similar structure shown in FIG. 1 as in EXAMPLE 1 were produced in the same production process and the same production conditions as in EXAMPLE 1.

However, in EXAMPLE 3, conditions for heat-treating the Ni plating layers disposed on the underlying electrode layers were as follows. Furthermore, the thickness of each Ni plating layer was changed as follows. Other conditions were identical to those in EXAMPLES 1 and 2.

Heat-Treatment Condition
(a) Heat-treatment temperature:
600° C.
(b) Oxygen concentration in heat treatment:
50 ppm
(c) Heat-treatment time:
0.5 hour, 1 hour, and 2 hours Thickness of Ni Plating Layer
0.5 μm, 1.0 μm, 3.0 μm, 5.0 μm, 7.0 μm, and 9.0 μm The resulting multilayer ceramic capacitors were subjected to reflow soldering with lead-free solder containing Zn at about 230° C. in a $N_2$ atmosphere to be mounted on a board. The multilayer ceramic capacitors were left standing for approximately 144 hours at about 125° C., about 1.2 atm, and about 95% RH while a rated voltage was applied. A change in the insulation resistance of each multilayer ceramic capacitor was checked. The multilayer ceramic capacitor in which the insulation resistance was reduced compared with an initial value was defined as a failure, and the number of failures was counted.

Table 7 shows the results.

TABLE 7

| Time (min) | Number of occurrence of failure of insulation resistance N = 5 | | | | | |
|---|---|---|---|---|---|---|
| | Thickness of Ni plating layer 0.5 μm | Thickness of Ni plating layer 1.0 μm | Thickness of Ni plating layer 3.0 μm | Thickness of Ni plating layer 5.0 μm | Thickness of Ni plating layer 7.0 μm | Thickness of Ni plating layer 9.0 μm |
| 30 | 5 | 2 | 0 | 1 | 5 | 5 |
| 60 | 5 | 2 | 0 | 0 | 2 | 5 |
| 120 | 5 | 2 | 0 | 0 | 0 | 3 |

As is apparent from the results shown in Table 7, when the Ni plating layers each have a thickness of about 3.0 μm or more, the Ni plating layers each having a smaller thickness can inhibit the reduction in insulation resistance by heat treatment for a shorter period of time.

A smaller thickness of each Ni plating layer resulted in a decrease in the distance in which Cu can disperse. It is assumed that the amount of Cu present in the vicinity of each Ni plating layer and the corresponding Cu underlying electrode layers was increased to inhibit the reduction in insulation resistance.

An excessively small thickness of each Ni plating layer resulted in a degradation in insulation resistance. This may be because the effect of the alloy layer of inhibiting the reduction in insulation resistance was not expressed due to the deterioration of continuity of each Ni plating layer.

As in EXAMPLE 2, a Ni—Cu alloy layer (Cu: 30 atomic percent or more) having a thickness of abut 0.5 μm or more was formed between each Cu underlying electrode layer and the corresponding Ni plating layer under conditions in which the insulation resistance was not degraded. It is believed that the resulting high-density alloy layers improve denseness.

As described above, heat treatment is performed under the conditions described in EXAMPLE 3 after the underlying electrode layers are Ni-plated. Thus, the high-density alloy layer for inhibiting the degradation of the insulation resistance can be formed between each underlying electrode layer and the corresponding Ni plating layer. It is possible to an electronic component including external electrodes having satisfactory solderability without a reduction in insulation resistance even when soldering is performed with lead-free solder.

EXAMPLE 4

In EXAMPLE 4, multilayer ceramic capacitors having the similar structure shown in FIG. 1 as in EXAMPLE 1 were produced in the same production process and the same production conditions as in EXAMPLE 1.

However, in EXAMPLE 4, conditions for heat-treating the Ni plating layers disposed on the underlying electrode layers were as follows. The following conditions are the same as those in EXAMPLE 1, except that the oxygen concentrations in heat treatment were about 1 ppm and about 5 ppm, and the case of a heat-treatment temperature of 100° C. was eliminated.

Heat-Treatment Conditions (a) Heat-treatment temperature:

heat treatment was not performed, 300° C., 500° C., 700° C., 900° C., and 1000° C.

(b) Oxygen concentration in heat treatment:

1 ppm, 5 ppm, 50 ppm, 100 ppm, 150 ppm, and 200 ppm (c) Heat-treatment time:

1 hour

In the samples of the multilayer ceramic capacitors, the average particle size of Ni particles constituting the Ni plating layers and the thicknesses of the Ni oxide layers were checked. Table 8 shows the average particle size of the Ni particles. Table 9 shows the thicknesses of the Ni oxide layers.

Measuring methods of the average particle size of the Ni particles and the thickness of each Ni oxide layer are the same as in EXAMPLE 1.

TABLE 8

| | | Average particle size of Ni particles constituting Ni plating layer (μm) | | | | | |
|---|---|---|---|---|---|---|---|
| Sample | Heat-treatment temperature (° C.) | Oxygen concentration 1 ppm or less | Oxygen concentration 5 ppm | Oxygen concentration 50 ppm | Oxygen concentration 100 ppm | Oxygen concentration 150 ppm | Oxygen concentration 200 ppm |
| 1 | Heat treatment was not performed | | | 0.5 | | | |
| 2 | 300 | 1.0 | 0.9 | 0.9 | 1.0 | 1.1 | 1.3 |
| 3 | 500 | 2.0 | 2.0 | 2.0 | 2.2 | 2.3 | 2.3 |
| 4 | 700 | 2.3 | 2.2 | 2.5 | 2.5 | 2.7 | 2.7 |
| 5 | 900 | 2.6 | 2.6 | 2.8 | 2.9 | 3.0 | 3.1 |
| 6 | 1000 | 3.3 | 3.3 | 3.3 | 3.5 | 3.5 | 3.6 |

TABLE 9

| | | Thickness of Ni oxide layer (nm) | | | | | |
|---|---|---|---|---|---|---|---|
| Sample | Heat-treatment temperature (° C.) | Oxygen concentration 1 ppm or less | Oxygen concentration 5 ppm | Oxygen concentration 50 ppm | Oxygen concentration 100 ppm | Oxygen concentration 150 ppm | Oxygen concentration 200 ppm |
| 1 | Heat treatment was not performed | | | 50 | | | |
| 2 | 300 | 50 | 100 | 115 | 130 | 160 | 190 |
| 3 | 500 | 50 | 105 | 120 | 135 | 165 | 200 |
| 4 | 700 | 50 | 110 | 130 | 140 | 170 | 210 |
| 5 | 900 | 50 | 130 | 145 | 150 | 200 | 220 |
| 6 | 1000 | 85 | 135 | 155 | 160 | 210 | 230 |

As shown in Table 8, performing the heat treatment at about 500° C. to about 1000° C. inclusive in the atmospheres having oxygen concentrations of about 1 ppm and about 5 ppm resulted in the average particle size of the Ni particles of about 2 μm or more, the Ni particles constituting the Ni plating layers, in the same way as in the case of the heat treatment performed in the atmospheres having oxygen concentrations of about 50 ppm to about 200 ppm inclusive.

As shown in Table 9, in the case where heat treatment was performed in the atmospheres having oxygen concentrations of about 1 ppm and about 5 ppm, performing the heat treatment at any firing temperature in the range of about 300° C. to about 1000° C. inclusive resulted in the Ni oxide layers each having a thickness of less than about 150 nm. In the case where heat treatment was performed in the atmospheres having oxygen concentrations of about 50 ppm and about 100 ppm, performing the heat treatment at about 900° C. or lower resulted in the Ni oxide layers each having a thickness of less than about 150 nm. In the case where heat treatment was performed in the atmospheres having oxygen concentrations of about 150 ppm and about 200 ppm, performing the heat treatment at any firing temperature in the range of about 300° C. to about 1000° C. inclusive resulted in the Ni oxide layers each having a thickness of about 150 nm or more, which was not preferred.

In EXAMPLE 4, the multilayer ceramic capacitors produced by performing heat treatment under the conditions described above were subjected to reflow soldering with lead-free solder containing Zn at about 230° C. in a $N_2$ atmosphere to be mounted on aboard. The multilayer ceramic capacitors were left standing for approximately 72 hours at about 125° C., about 1.2 atm, and about 95%RH while a rated voltage was applied. A change in the insulation resistance of each multilayer ceramic capacitor was checked. The multilayer ceramic capacitor in which the insulation resistance was reduced compared with an initial value was defined as a failure, and the number of failures was counted.

Table 10 shows the results.

TABLE 10

| | | Number of occurrence of failure of insulation resistance N = 5 | | | | | |
|---|---|---|---|---|---|---|---|
| Sample | Heat-treatment temperature (° C.) | Oxygen concentration 1 ppm or less | Oxygen concentration 5 ppm | Oxygen concentration 50 ppm | Oxygen concentration 100 ppm | Oxygen concentration 150 ppm | Oxygen concentration 200 ppm |
| 1 | Heat treatment was not performed | | | 5 | | | |
| 2 | 300 | 5 | 5 | 5 | 5 | 5 | 5 |
| 3 | 500 | 0 | 0 | 0 | 0 | 0 | 0 |
| 4 | 700 | 0 | 0 | 0 | 0 | 0 | 0 |
| 5 | 900 | 0 | 0 | 0 | 0 | 0 | 0 |
| 6 | 1000 | 0 | 0 | 0 | 0 | 0 | 0 |

As is apparent from Table 10, in the case where heat treatment was performed in atmospheres having oxygen concentrations of about 1 ppm and about 5 ppm, a reduction in the insulation resistance of each multilayer ceramic capacitor was able to be inhibited within the heat-treatment temperature of about 500° C. to about 1000° C. inclusive. However, in the cases where the heat-treatment temperature was about 300° C. and where heat treatment was not performed, the occurrence of the failure of insulation resistance was observed in all samples (N=5).

In EXAMPLE 4, the multilayer ceramic capacitors produced by performing heat treatment under the above-described conditions were subjected to solderability test at about 230° C. with lead-free solder containing about 3 percent by weight Bi, about 8 percent by weight Zn, and Sn constituting the remainder (Sn—8Zn—3Bi).

The solderability test was performed by immersing the multilayer ceramic capacitors in a solder bath for three seconds. The multilayer ceramic capacitor in which the area of solder attached was about 95% or less was determined as a failure.

Table 11 shows the results.

TABLE 11

| Sample | Heat-treatment temperature (° C.) | Number of occurrence of failure of solderability N = 10 | | | | | |
|---|---|---|---|---|---|---|---|
| | | Oxygen concentration 1 ppm or less | Oxygen concentration 5 ppm | Oxygen concentration 50 ppm | Oxygen concentration 100 ppm | Oxygen concentration 150 ppm | Oxygen concentration 200 ppm |
| 1 | Heat treatment was not performed | | | 50 | | | |
| 2 | 300 | 0 | 0 | 0 | 0 | 3 | 9 |
| 3 | 500 | 0 | 0 | 0 | 0 | 5 | 10 |
| 4 | 700 | 0 | 0 | 0 | 0 | 8 | 10 |
| 5 | 900 | 0 | 0 | 0 | 0 | 10 | 10 |
| 6 | 1000 | 1 | 1 | 1 | 4 | 10 | 10 |

As shown in Table 11, the results demonstrated that no failure occurred at heat-treatment temperatures of about 900° C. or lower and at oxygen concentrations of about 1 ppm to about 100 ppm inclusive. The failure of solderability occurred under other conditions shown in Table 11.

As is apparent from Tables 10 and 11, it is possible to prevent the occurrence of failures of insulation resistance and solderability at oxygen concentrations of about 1 ppm to about 100 ppm inclusive and at heat-treatment temperatures of about 500° C. to about 900° C. inclusive.

Board Deflection Test

The multilayer ceramic capacitors heat-treated at oxygen concentrations of about 1 ppm to about 100 ppm inclusive and at heat-treatment temperatures of about 500° C. to about 900° C. inclusive were subjected to a board bending test. There was no failure in the multilayer ceramic capacitors heat-treated at the conditions in the tests for insulation resistance and solderability.

With respect to the board deflection test, each multilayer ceramic capacitor was mounted on a board with Pb—Sn eutectic solder. The board was deflected by about 2 mm at about 1 mm/sec. A breaking sound generating in deflecting the board was detected. The amount of deflection at the point of the detection of the breaking sound was measured as the deflection strength. Table 12 shows the results.

In the case where the heat treatment is not performed, as schematically shown in FIG. 3A, when a board (mounting board) 21 is deflected, crack C is produced from ends of the external electrodes 5a and 5b to the ceramic body (main body of the electronic component) 1. In the case where the heat treatment is performed, as schematically shown in FIG. 3B, a crack does not occur in the ceramic body (main body of the electronic component) 1. The reasons for this are not altogether clear. It is assumed that in the case where the heat treatment is performed, when the board 21 is deflected, delamination occurs at interfaces between the heat-treated Ni plating layers 7a and 7b and the Sn plating layers (upper plating layers) 8a and 8b before in the ceramic body (main body of the electronic component) 1, thereby relaxing the stress to inhibit the production of the crack in the ceramic body (main body of the electronic component) 1.

Electrical Properties in Deflecting Board

Multilayer ceramic capacitors heat-treated at about 500° C. (condition 1), about 700° C. (condition 2), and about 900° C. (condition 3) in an atmosphere having an oxygen concentration of about 1 ppm or less were each mounted on a board. The board was deflected by about 2 mm. The rate of capacitance change was measured while heat-treated Ni plating layer was

TABLE 12

| Sample | Heat-treatment temperature (° C.) | Average deflection strength of board (mm) N = 10 | | | |
|---|---|---|---|---|---|
| | | Oxygen concentration 1 ppm or less | Oxygen concentration 5 ppm | Oxygen concentration 50 ppm | Oxygen concentration 100 ppm |
| 1 | Heat treatment was not performed | | 5.7 | | |
| 2 | 500 | 7.2 | 6.9 | 7.1 | 6.8 |
| 3 | 700 | 7.0 | 7.0 | 7.2 | 7.1 |
| 4 | 900 | 7.0 | 6.8 | 7.2 | 6.9 |

Figure 4:
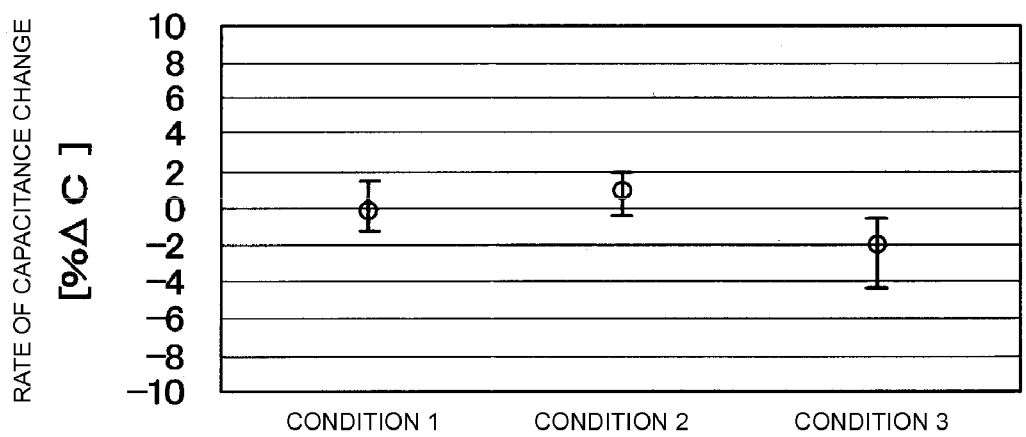
FIG. 4 is a graph showing the rate of capacitance change of a multilayer ceramic capacitor according to a preferred embodiment (EXAMPLE 4) of the present invention when a board is bent.

As shown in Table 12, the results demonstrated that there was no tendency of the average deflection strength (N=10) with respect to the oxygen concentration in the heat treatment atmosphere, and the average deflection strength of the board subjected to the heat treatment under the conditions shown in Table 12 is improved compared with the case in which the heat treatment was not performed.

detached from the Sn plating layer (upper plating layer) at the interface therebetween. FIG. 4 shows the rate of capacitance change under each condition.

As shown in FIG. 4, the results demonstrated that the rate of capacitance change under each condition was significantly small, and substantially no degradation of electrical properties was obtained even when the board was deflected.

Bonding Strength of Electronic Component to Board

Figure 5:
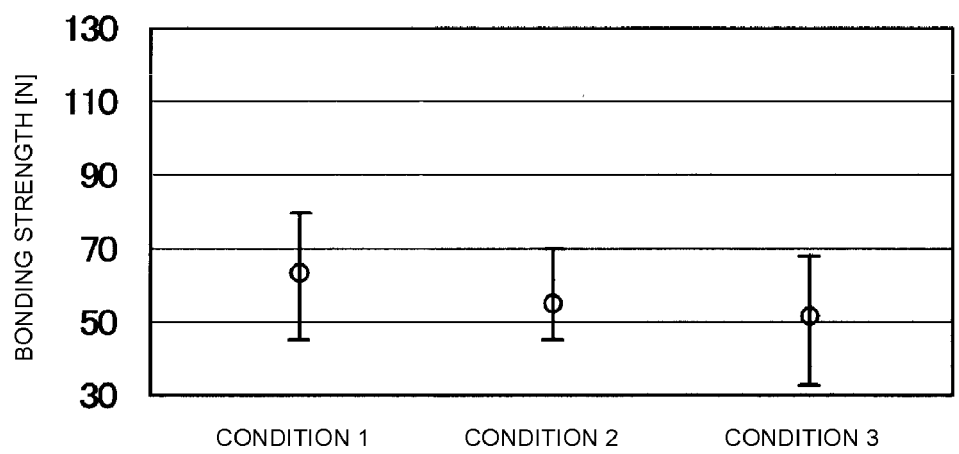
FIG. 5 is a graph showing the strength of bonding between a multilayer ceramic capacitor according to a preferred embodiment (EXAMPLE 4) of the present invention and a board.

Multilayer ceramic capacitors without heat-treatment (condition 1), multilayer ceramic capacitors heat-treated in an atmosphere having an oxygen concentration of about 1 ppm or less at about 500° C. (condition 2), and multilayer ceramic capacitors heat-treated in an atmosphere having an oxygen concentration of about 1 ppm or less at about 900° C. (condition 3) were each mounted on a board. The force (bonding strength) required to detach each multilayer ceramic capacitor from the board by exerting a pressing force on a side surface of each multilayer ceramic capacitor was measured. FIG. 5 shows the bonding strength under each condition.

As shown in FIG. 5, the results demonstrated that the difference in bonding strength among condition 1, in which the heat treatment was not performed, and conditions 1 and 2, in which the heat treatment was performed, was small, and in the heat-treated multilayer ceramic capacitors according to preferred embodiments of the present invention, the bonding strength sufficient for practical applications was achieved.

Evaluation of Resistance to Thermal Shock

Multilayer ceramic capacitors without heat-treatment (condition 1), multilayer ceramic capacitors heat-treated in an atmosphere having an oxygen concentration of 1 ppm or less at about 500° C. (condition 2), and multilayer ceramic capacitors heat-treated in an atmosphere having an oxygen concentration of about 1 ppm or less at about 900° C. (condition 3) were each mounted on aboard. The resulting multilayer ceramic capacitors were left standing in the environment in which a cycle of heating and cooling was repeated about 1000 times in the range of about −55° C. to about +85° C. inclusive. The rate of capacitance change, a dielectric loss, and insulation resistance were measured at about 100 cycles, about 200 cycles, and about 1000 cycles.

Figure 6A:
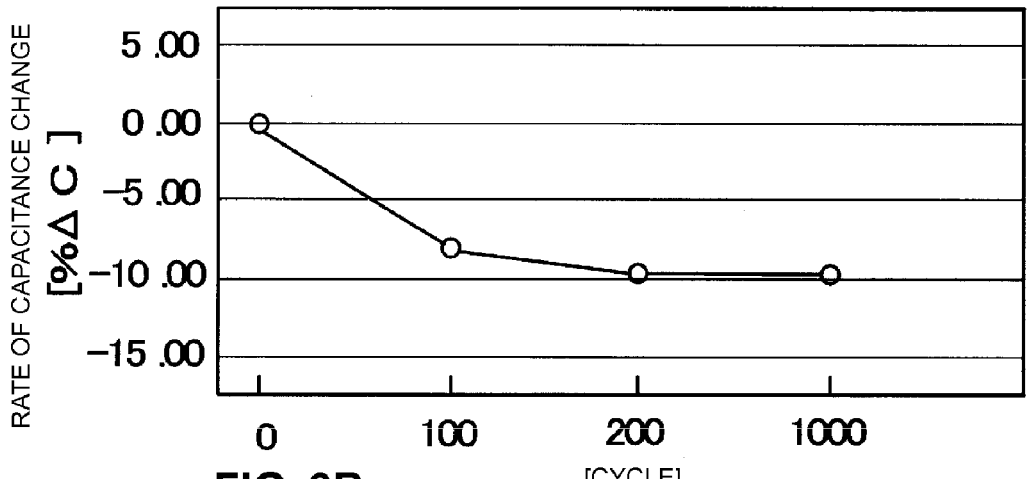
FIGS. 6A, 6B, and 6C are each a graph showing the relationship between the number of cycles of thermal shock and the rate of capacitance change of a multilayer ceramic capacitor according to a preferred embodiment (EXAMPLE 4) of the present invention, the multilayer ceramic capacitor being fired in an atmosphere having an oxygen concentration of about 1 ppm or less.
Figure 6B:
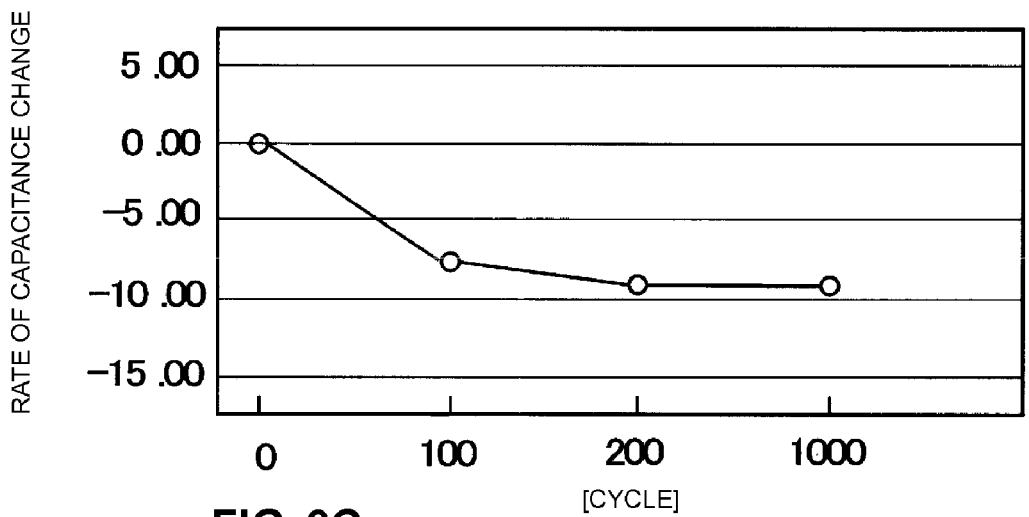
Figure 6C:
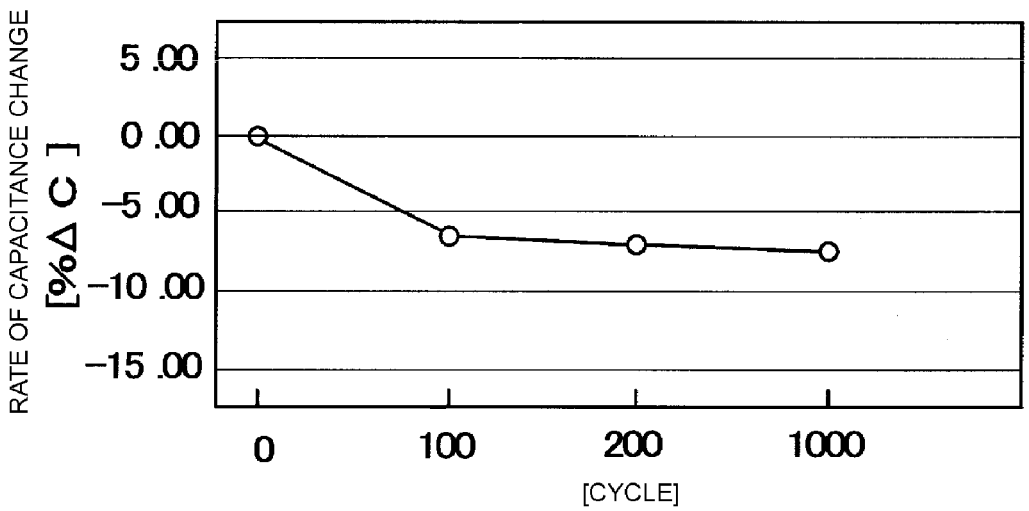

FIGS. 6A, 6B, and 6C each show the rate of capacitance change under each condition.

Figure 7A:
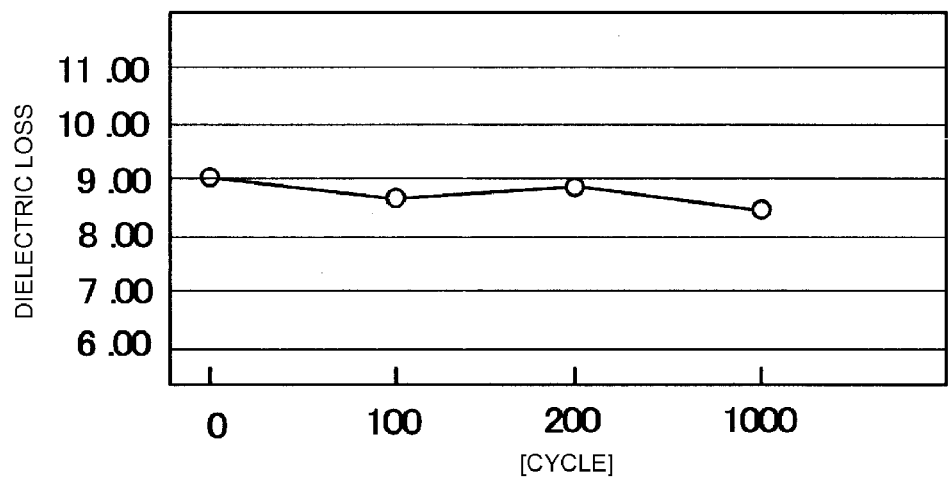
FIGS. 7A, 7B, and 7C are each a graph showing the relationship between the number of cycles of thermal shock and the dielectric loss of a multilayer ceramic capacitor according to a preferred embodiment (EXAMPLE 4) of the present invention, the multilayer ceramic capacitor being fired in an atmosphere having an oxygen concentration of about 1 ppm or less.
Figure 7B:
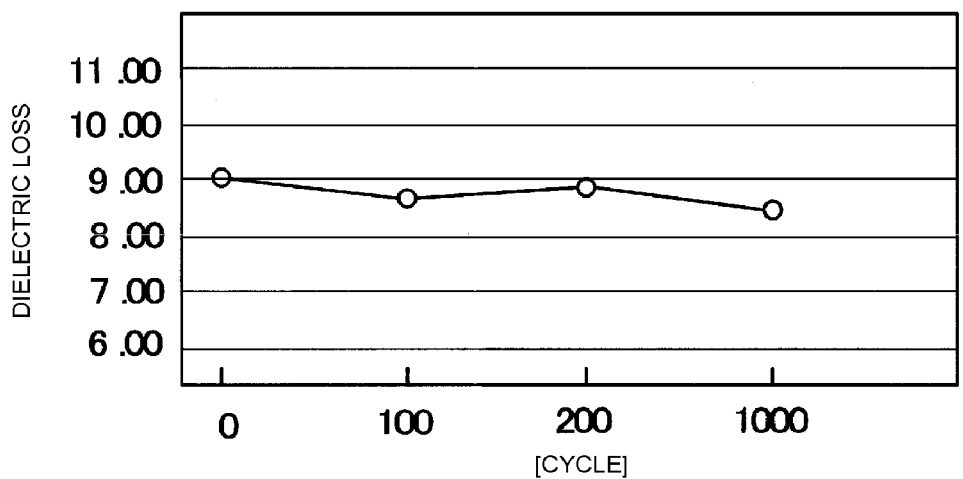
Figure 7C:
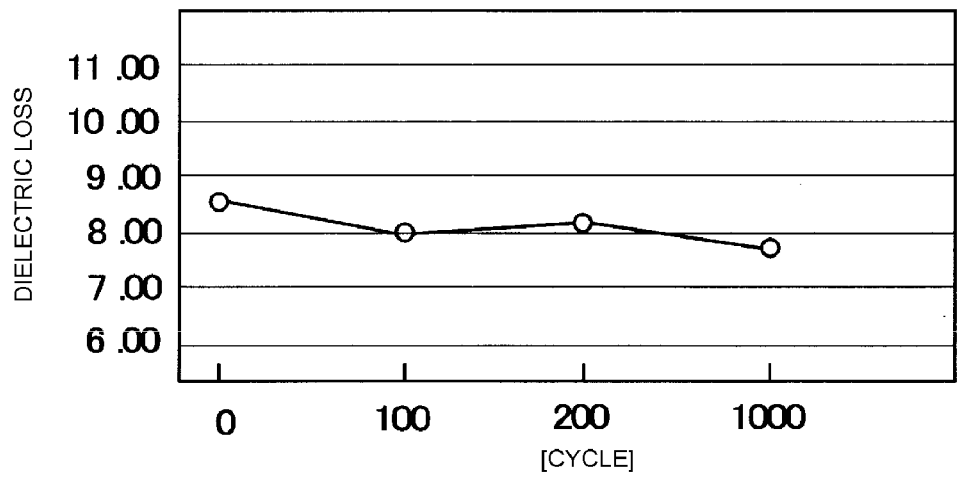

FIGS. 7A, 7B, and 7C, each show the dielectric loss under each condition.

Figure 8A:
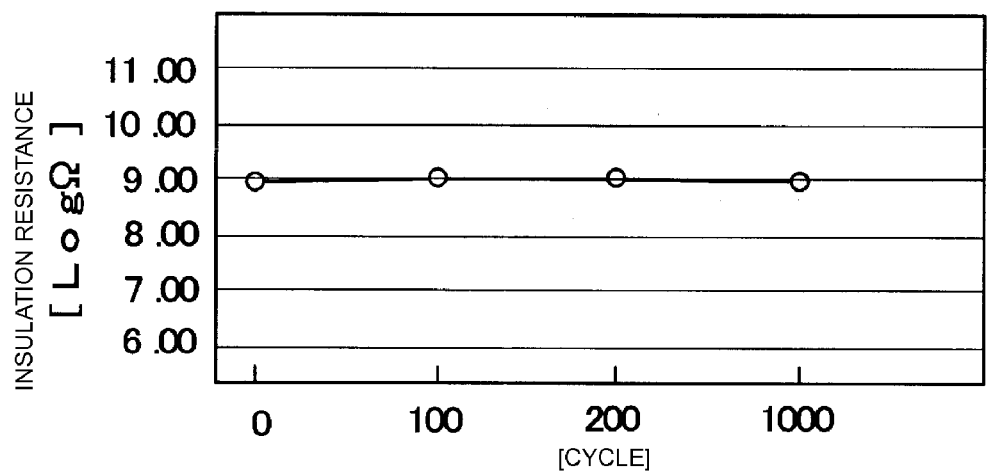
FIGS. 8A, 8B, and 8C are each a graph showing the relationship between the number of cycles of thermal shock and the insulation resistance of a multilayer ceramic capacitor according to a preferred embodiment (EXAMPLE 4) of the present invention, the multilayer ceramic capacitor being fired in an atmosphere having an oxygen concentration of about 1 ppm or less.
Figure 8B:
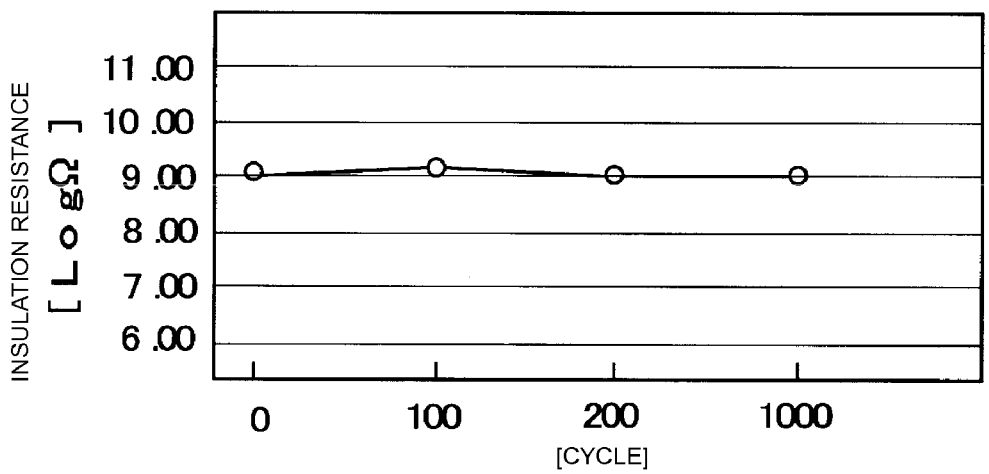
Figure 8C:
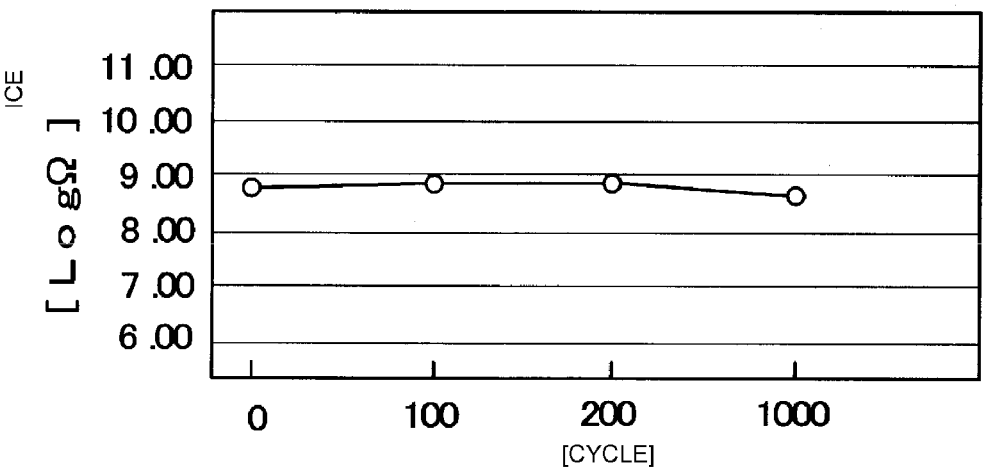
Figure 9:
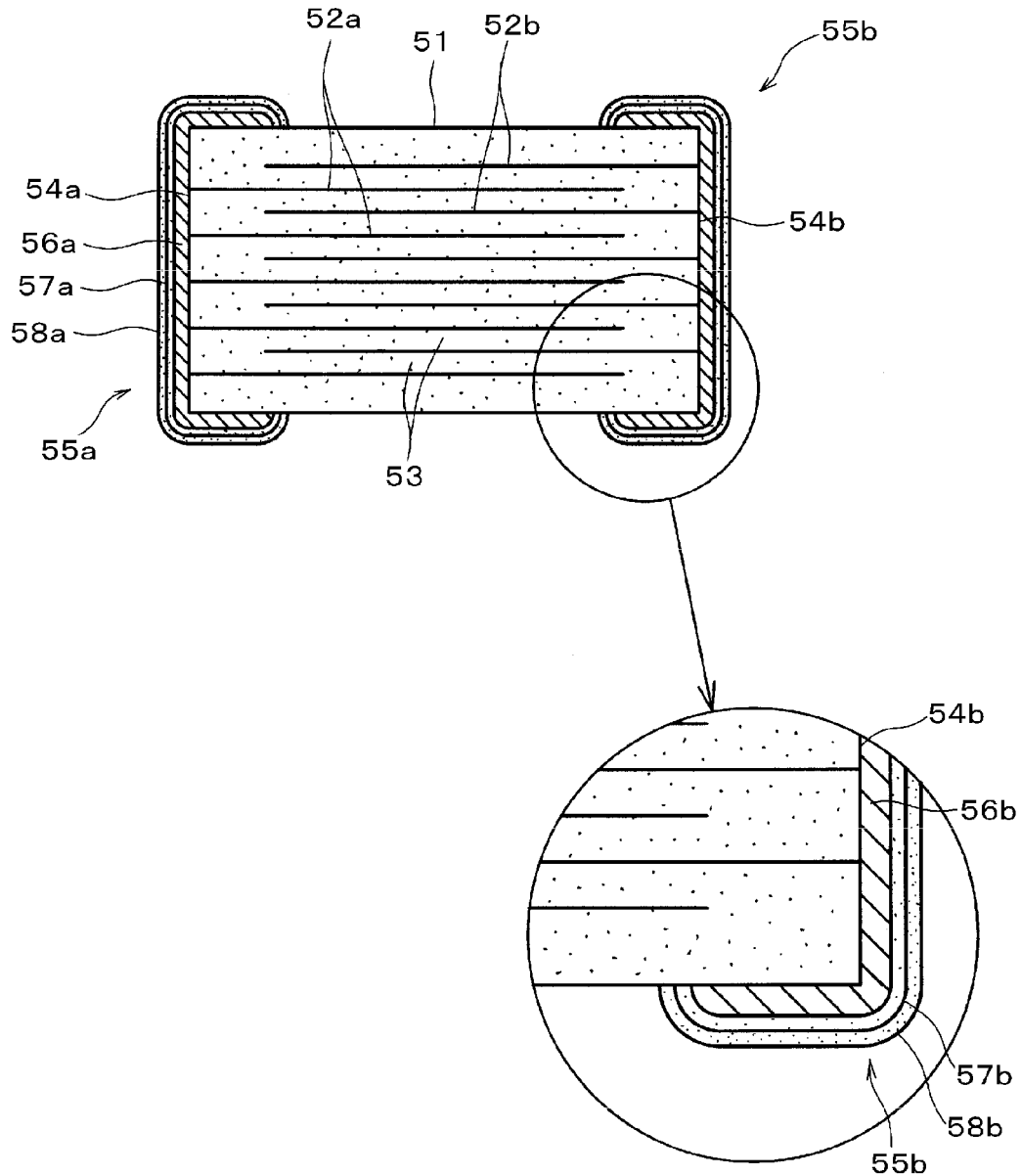
FIG. 9 is a cross-sectional view of a known multilayer ceramic capacitor.

FIGS. 8A, 8B, and 8C, each show the insulation resistance under each condition.

As shown in FIGS. 6A to 8C, the results demonstrated that the difference in properties among condition 1, in which the heat treatment was not performed, and conditions 2 and 3, in which the heat treatment was performed, was small. The heat-treated multilayer ceramic capacitors according to preferred embodiments of the present invention have properties, i.e., the rate of capacitance change, the dielectric loss, and the insulation resistance, equivalent to those of multilayer ceramic capacitors that were not subjected to heat treatment. Thus, the multilayer ceramic capacitors according to preferred embodiments of the present invention can be used for practical purposes.

The tests for evaluating the electrical properties in deflecting the board, the bonding strength of the electronic component to the board, and the resistance to thermal shock were conducted at an oxygen concentration of about 1 ppm or less. However, even when the tests were conducted at an oxygen concentration of about 100 ppm or less, substantially the same results were obtained.

When the heat treatment was performed in an atmosphere having an oxygen concentration of about 1 ppm or less, the results demonstrated that an electronic component including the external electrodes having particularly satisfactory solder wettability was able to be produced (specific data was not shown here).

In the above-described examples, the multilayer ceramic capacitor has been described as an example. The present invention is not limited to the multilayer ceramic capacitor. The present invention can be applied to multilayer varistors, multilayer LC composites, multilayer circuit boards, and various electronic components including an external electrode on the surface of the main body of each electronic component. In this case, the same effects as those in the above-described preferred embodiments can be achieved.

Furthermore, in the above-described examples, the underlying electrode layers formed of the Cu electrode layers have been described as an example. Even when the metal material constituting each of the underlying electrode layers is a material other than Cu, for example, Ag, an Ag alloy, or a Cu alloy, the present invention can be applied.

In the above-described examples, the Sn plating layers functioning as the upper plating layers are disposed on the heat-treated Ni plating layers. The upper plating layers are not limited to the Sn plating layers. The upper plating layers may be each composed of Sn—Pb, Sn—Bi, or Sn—Ag. Furthermore, each upper plating layer may have a multilayer structure as well as a single-layer structure.

Moreover, the present invention is not limited to any other point of the examples. With respect to the type of material constituting the main body of the electronic component, the specific structure of the main body of the electronic component, the material of the internal electrode, the presence or absence of the internal electrode, and the like, various applications and modifications may be made without departing from the scope of the invention.

As described above, according to preferred embodiments of the present invention, it is possible to provide a high-reliability electronic component in which a decrease in insulation resistance is small under high-temperature and high-humidity conditions even when the electronic component is mounted with lead-free solder, and the electronic component having satisfactory solderability.

Therefore, preferred embodiments of the present invention may be widely applied to various electronic components each having a structure in which an external electrode is disposed on a surface of an electronic component body and applied to a process for producing the electronic components.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An electronic component comprising:
    a main body; and
    an external electrode disposed on a surface of the main body, the external electrode including:
        an underlying electrode layer containing a metal;
        an alloy layer composed of Ni and the metal contained in the underlying electrode layer, the alloy layer being disposed on the underlying electrode layer;
        a Ni plating layer disposed on the alloy layer;
        a Ni oxide layer disposed on the Ni plating layer; and
        an upper plating layer disposed on the Ni oxide layer;
        the Ni oxide layer having a thickness of about 150 nm or less; and
        the Ni plating layer having an average particle size of Ni particles of about 2 μm or more.

2. The electronic component according to claim 1, wherein the underlying electrode layer is mainly composed of Cu.

3. The electronic component according to claim 1, wherein the upper plating layer disposed on the Ni oxide layer is composed of Sn as a main component.

4. The electronic component according to claim 1, wherein the main body of the electronic component includes a sintered ceramic body and an internal electrode disposed in the sintered ceramic body, and the internal electrode is electrically connected to the corresponding external electrode.

5. A mounting structure of the electronic component according to claim 1, the electronic component being mounted on a land of a mounting board, wherein the external electrode of the electronic component is electrically connected to the land of the mounting board with lead-free solder.

6. The mounting structure of the electronic component according to claim 5, wherein the lead-free solder contains Zn.

7. The mounting structure of the electronic component according to claim 5, wherein the upper plating layer is partially detached from the Ni oxide layer at an interface therebetween.

* * * * *